United States Patent Office

2,838,422
Patented June 10, 1958

2,838,422

PROCESS FOR RENDERING FIBROUS MATERIALS WATER-REPELLING

Ludwig Orthner and Martin Reuter, Frankfurt am Main, Germany, assignors to Farbwerke Hoechst Aktiengesellschaft vormals Meister Lucius & Bruning, Frankfurt am Main, Germany, a corporation of Germany No Drawing. Application May 11, 1954
Serial No. 429,118

Claims priority, application Germany May 18, 1953

20 Claims. (Cl. 117—135.5)

The present invention relates to a process for rendering fibrous materials water-repelling.

From U. S. Patent No. 2,469,041 it is known that tribasic aluminium salts of soap forming organic acids, with or without addition of other substances, are suitable for rendering textiles, in organic solvents, water repellent. It has been ascertained, however, that only a small hydrophobic effect is obtained by these two processes and, in particular, that the capacity for repelling water in the form of droplets is insufficient.

Now, we have found that a good hydrophobic effect and an excellent capacity for repelling water in the form of droplets are obtained by treating the fibrous materials with solutions in organic solvents of tribasic mixed aluminium salts with from about 1.5 to about 2.8 mols of organic acids having a boiling point below about 200° C. under normal pressure or sublimating below the said temperature, and with from about 0.2 to about 1.5 mols of scarcely volatile organic high molecular weight compounds of acid nature capable of forming salts with aluminium, and advantageously of hydrophobic organic substances of high molecular weight and by subsequently subjecting them advantageously to a thermal treatment in the presence or absence of moisture.

Of particular value are the combinations of about 2 to about 2.5 mols of aliphatic carboxylic acids of low molecular weight, such as formic acid or acetic acid, with about 0.5 to about 1 mol of soap forming fatty acids, such as palmitic acid, stearic acid or oleic acid.

Instead of the above mentioned preformed mixed tribasic aluminium salts, there may be used mixtures of their starting materials, for instance, mixtures of aluminium alcoholates with the above mentioned acids. As organic acids boiling below about 200° C. under normal pressure or sublimating below the said temperature, there can be used, for instance: aliphatic carboxylic acids of low molecular weight, such as formic acid, acetic acid, propionic acid, benzoic acid, chloracetic acid, cyclopentane carboxylic acid, thiophene-alpha-carboxylic acid or their mixtures and the like.

The above mentioned difficultly volatile organic high molecular weight substances of acidic character capable of forming salts with aluminium, must have a boiling point higher than about 250° C. under normal pressure, i. e. they must not sublimate below this temperature.

There come into consideration high molecular carboxylic acids, sulfinic acids, sulfonic acids, monosulfuric esters, sulfamic acids, phosphonic acids, phosphoric acid esters, diacylamides with carboxyl and/or sulfonyl radicals, sulfamides or mixtures of these substances etc. In general, monovalent acids are used; in special cases, however, they can be diluted with divalent acids, for instance, suberic acid, o-phthalic acid and the like.

The above mentioned acids may belong to the aliphatic, alicyclic, aromatic and heterocyclic series, and may contain additional inert substituents of a neutral character, for instance halogen atoms or groups such as the groups OH or SH or ether, thioether or ester groups, carboxylic acid amide or urea groups or the like. The carbon chain of these compounds may be interrupted by hetero-atoms such as oxygen, nitrogen or sulfur.

As aliphatic carboxylic acids there may be mentioned, for instance: capric acid, stearic acid, oleic acid, palmitic acid, lauric acid, myristic acid, behenic acid, montanic acid, mixtures of fatty acids obtained by the oxidation of paraffin wax, resin acids such as abietic acid or colophony. Instead of the single acids there may be used mixtures of the said acids or mixtures of acids which are obtained from natural, and, if desired, hydrogenated products. Mixtures of this kind are, for instance: the fatty acids of sperm oil, coconut oil, tall oil, linseed oil, soy bean oil, fish oil, cottonseed oil, train oil, peanut oil, sulfocarbon oil, rape oil, tallow, animal oil, bone fat, lard or tung oil, dodecylsulfonamido-acetic acid and mixtures of aliphatic alkylsulfonamido-acetic acids.

As aromatic carboxylic acids there are mentioned, for instance: alpha-naphthoic acid, β-naphthoic acid, alpha-naphthoxy-acetic acid, β-naphthoxy-acetic acid, phenyl-acetic acid, cinnamic acid, phthalic acid monoethyl ester, salicylic acid, 2:3-hydroxynaphthoic acid, 3-hydroxy-benzoic acid, 4-hydroxybenzoic acid, methoxy-benzoic acid, phenoxy-acetic acid, 2:4-dichloro-phenoxy-acetic acid, the semi-amide of phthalic acid, paratoluene-sulfon-amido-acetic acid and the like.

As hetero-cyclic carboxylic acids there may be used, for instance: 2-hydroxy-carbazole-3-carboxylic acid, 3-hydroxy-diphenylene oxide-2-carboxylic acid, 1-phenyl-5-pyrazolone-3-carboxylic acid, 5-benzoyl-benzoxazolone-2-carboxylic acid, 3-hydroxy-2-methyl-quinoline-4-carboxylic acid. As diacylamides of carboxylic acids are named, for instance: dibenzamide, phthalimide and the like.

As organic sulfinic and sulfonic acids there come into consideration, for instance: the sulfinic acids of dodecane, cyclohexane, benzene, dodecane sulfonic acid, cyclohexane sulfonic acid, benzene sulfonic acid, paratoluene sulfonic acid, naphthalene sulfonic acid, octyl-benzene sulfonic acid, butyl-naphthalene sulfonic acid, phenol sulfonic acid, naphthol sulfonic acid, 2-hydroxy-carbazole-7-sulfonic acid, and thiophene-alpha-sulfonic acid.

There may also be used the amides and imides of such sulfonic acids, as for example dodecane sulfonamide, paratoluene-sulfonamide, benzene disulfimide, para-toluene-disulfimide, dodecane disulfimide.

There can also be used, for instance, sulfinic acids, sulfonic acids, sulfonamides or sulfimides from mixtures of hydrocarbons of high molecular weight which can be obtained, for example, by known processes from the sulfochlorides of fossil and synthetic diesel oils, or by sulfonation of petroleum distillates and alkyl-benzenes.

As organic monosulfuric esters there come into consideration, for example: dodecyl-sulfuric acid ester, stearyl-sulfuric acid ester, benzyl-sulfuric acid ester, and alkylphenol-sulfuric acid ester.

As organic sulfamic acids there may be mentioned, for example: dodecyl-sulfamic acid, alkylphenyl-sulfamic acid.

Furthermore, there are mentioned, for instance: cyclic acid imides of the heterocyclic series: alkyl-barbituric acids.

As organic phosphonic acids there may be used, for instance: the dodecyl ester of cyclohexane phosphonic acid and the octadecyl ester of phenyl phosphonic acid.

As monobasic phosphoric acid esters there are named: the dialkyl esters of phosphoric acid of the formula $PO(OR)_2OH$ [R=an aliphatic or alicyclic radical] such as the didodecyl, dibenzyl, dioctadecyl ester of phosphoric acid, As aluminium alcoholates there are used, for example, those derived from aliphatic alcohols, low to medium molecular weight. There may be mentioned, for instance, aluminium methylate, aluminium ethylate, aluminium propylate, aluminium isopropylate, aluminium butylate, aluminium isobutylate, aluminium amylate, aluminium hexylate, aluminium octylate, aluminium-2-ethylbutylate, aluminium-2-ethyl-hexylate, and the like mixtures of these substances, or mixed aluminium alcoholates.

There are also suitable aluminium alcoholates which contain, per equivalent of aluminium, less than 1 equivalent of organic radicals which are bound through oxygen in the manner of ethers, for instance those of which the solubility in organic solvents has been improved by the thermal or hydrolytic treatment of normal aluminium alcoholates with the splitting off of a part of the alkoxy groups, in most cases probably with the linking of aluminium atoms in chain fashion through oxygen atoms.

Among these aluminium alcoholates there may be mentioned, for example: the aluminium ethylates obtained by thermal treatment and which correspond to the empirical molecular formulae $Al_2(OC_2H_5)_4O$ and $$Al_4(OC_2H_5)_6O_3$$

as described by Henle (Berichte der deutschen chemischen Gesellschaft, vol. 53, page 720); the aluminium ethylate obtained by hydrolytic treatment as described in German patent specifications 277,187 and 277,188, and containing about 2 ethoxyl radicals per atom of aluminium; the basic aluminium ethylate of the empirical molecular formula $Al(OH)(C_2H_5O)_2$ obtained by boiling with anhydrous alcohol with access of air as described by Meerwein and Bersin (Annalen, vol. 476, page 132); the aluminium dihydroxocyclohexanolate obtained as described by Meerwein and Bersin (l. c.) by heating aluminium cyclohexanolate at 275° C.; the basic aluminium ethylate obtained as described by Bersin (Dissertation Königsberg, 1928) by boiling with incompletely anhydrous ethanol, and containing about 2 ethoxyl groups per atom of aluminium. There are also mentioned those aluminium alcoholates which can be obtained from aluminium alcoholates by reaction with slightly hydrous alcohols according to the process described by Tischtschenko (Chem. Zentralblatt 1900, vol. 1, page 12).

There may also be used those readily soluble aluminium alcoholates which are obtained by the reaction of metallic aluminium with slightly hydrous alcohols, advantageously in the presence of an activating agent, and which contain, per equivalent of aluminium, about 0.5 to 0.8 alkoxy group.

Instead of the aluminium alcoholates there may be used for the preparation of the solutions of the aluminium alcoholates addition products of the aluminium alcoholates with carbon dioxide or sulfur dioxide (compare Tischtschenko, Chemisches Zentralblatt 1900, vol. 1, page 585). The said addition products are advantageously used whenever they are more stable during storage than the alcoholates themselves. When the addition compounds are dissolved in inert solvents, especially with the aid of heat, carbon dioxide or sulfur dioxide splits off and the alcoholates are regenerated.

The aluminium alcoholates may also be used in the form of their alkoxo-acids and/or in a form stabilized against moisture by means of volatile organic substances capable of forming complex compounds.

As hydrophobic organic substances of high molecular weight there come into consideration among others, particularly paraffin waxes but also other waxes, chlorinated hydrocarbons of high molecular weight and the like.

As paraffin hydrocarbons of high molecular weight there may be used, for example, the various forms of solid paraffins, for instance those having a solidification point of 52° C.–54° C.; furthermore, synthetic paraffin hydrocarbons of high molecular weight having a solidification point of about 50° C. to about 100° C., or the mixture thereof, and also ceresine.

Mixtures of solid paraffins with other paraffin hydrocarbons of high molecular weight may also be used, for instance, semi-solid paraffin slack wax of a dropping point of about 30° C. to about 40° C.

As natural or synthetic waxes there may be mentioned, for example, carnauba wax, candelilla wax, esters of montanic acids with aliphatic polyhydric alcohols and esters of higher fatty acids with higher fatty alcohols. By the use or addition of waxes the fastness to rubbing of the impregnation is generally improved and the fabric is considerably less susceptible to soiling.

As thickly oily or solid poly-chlorinated hydrocarbons of high molecular weight there may be used, for example, the chlorination products of fossil or synthetic aliphatic hydrocarbon oils boiling between about 200° C. and 400° C., or of fossil or synthetic solid paraffin hydrocarbons solidifying between about 50° C. and about 100° C., or of fossil or synthetic semi-solid paraffin slack waxes and chlorination products of aromatic hydrocarbons such as naphthalene. The chlorine content of the compounds may vary within wide limits and may amount to 80 percent, depending on the purpose for which the finished product is to be used.

When highly chlorinated hydrocarbons are used in the absence of substantial amounts of paraffins or waxes (in this case reaction products of 1 mol of an aluminium alcoholate with less than 0.8 mol of the monobasic difficultly volatile organic substance of acid nature capable of forming salts with aluminium and advantageously used as further impregnating components) there are obtained impregnated fabrics having remarkable flameproof properties in addition to the water-repellent properties.

The above mentioned paraffin hydrocarbons are advantageously used together with the said "aluminium reaction products," at a ratio of 1:1 to 2:1; satisfactory results are also obtained when the components are used at a ratio up to about 1:10 or 10:1.

As organic solvents there may be used, for instance, low boiling hydrocarbons or chlorinated hydrocarbons such as benzine, benzene, carbon tetrachloride, trichlorethylene, perchlorethylene, or the mixtures of these substances, if desired diluted with other organic solvents.

The process of the invention may be used for imparting water-repellent properties to vegetable, animal or synthetic fibrous materials, such as cotton, linen, viscose fibres, cuprammonium rayon, wool, silk, casein fibres, cellulose acetate fibres, polyamide fibres, polyacrylonitrile fibres, polyester fibres or mixtures thereof. The fibrous material may be treated before or after it has been worked up.

When the process is realized without addition of the above mentioned hydrophobic organic substances of high molecular weight, a slight hydrophobic effect is obtained which is of advantage for certain purposes, for instance for reducing the absorbing capacity of fibrous material from regenerated cellulose.

Very good effects are obtained even when dilute solutions are used. In general, it is of advantage to use solutions of 1–10 percent strength.

In the impregnation of polyamide or polyester fibres, good effects are obtained even by using solutions of about 0.1 percent strength. The solutions may be prepared by dissolving the components separately and then mixing the solutions together. When a solution of an aluminium alcoholate and a solution of an organic substance of acidic character capable of forming aluminium salts are mixed together, the reaction occurs even in the cold and is completed during the heat treatment to which the fibres are usually subjected. The components may also be dissolved together. Alternatively there may be prepared by mixing or fusing together the paraffin hydrocarbons and the said tribasic mixed aluminium salts or the reaction products of aluminium alcoholates with the said organic substances of acid nature, preparations which are dissolved in organic solvents when required for use. When the fibrous material has been treated at the ordinary or a raised temperature with the impregnating liquid, the excess of the latter is removed by drawing off, squeezing or the like and the fabric is then dried.

When garments are to be impregnated, the impregnation process is advantageously carried out in the machines customarily used for dry cleaning, and the excess of the impregnating liquid is then drawn off. The impregnated fabric is then centrifuged in the machine, and most of the solvent is distilled off at a raised temperature.

The residual solvent is removed by blowing in hot air which, if necessary, may still have a certain content of moisture. In order to improve the water-repellent effect the dry goods may be subjected in the usual manner to a heat treatment at about 50° C.–200° C., advantageously 100° C.–150° C., for instance in a drying cabinet and/or by ironing or hot pressing. This heat treatment is advantageously carried out in the presence of steam.

The impregnating liquid which has been drawn or squeezed off may be used again, if necessary, after strengthening it with the agent imparting water-repellent properties.

For the impregnation process the fabric is, in general, introduced in an air-dry condition. The normal moisture content of the fibrous material can, however, be reduced before the impregnation of the goods, by drying them.

The process of this invention may be combined with other finishing processes, preferably with those which are carried out in an organic solvent, for instance, with a process for rendering fabrics mothproof or with a final finish with a thermoplastic which is soluble in organic solvents, such as polyvinyl acetate or polyacrylic acid esters.

If desired, a small quantity of another inert thickly oily to solid non-hydrophilic organic substance of high molecular weight which is soluble in organic solvents may be added to the impregnation bath, depending on the purpose for which the fabric is to be used, for instance rubber, rubber hydrochloride, synthetic rubber, natural and synthetic resins such as shellac, phenoplastics, aminoplastics, alkyd resins, maleic acid ester resin, vinyl polymers, for instance, polyvinyl chloride, or the like, polyethylenes, polyisobutylenes, natural or synthetic esters of aliphatic polyhydric alcohols of high molecular weight with higher carboxylic acids, higher phthalic acid esters, nitrocellulose or the like.

The process is especially suitable for impregnating outer garments immediately after dry cleaning.

The following examples serve to illustrate the invention but they are not intended to limit it thereto, the parts being by weight unless otherwise stated and the relationship of parts by weight to parts by volume being the same as that of the gram to the litre:

*Example 1*

12,000 parts of aluminium-monostearate-diacetate prepared as a smooth wax in a known manner from aluminium ethylate according to German patent specification No. 569,946 or from aluminium chloride by reaction of 1 mol of stearic acid with 2 mols of glacial acetic acid, accompanied by splitting off of ethanol or hydrogen chloride, are dissolved with 20,000 parts of paraffin wax (solidification point 54° C.) in 1000 parts by volume of carbon tetrachloride or solvent benzine. In this bath air-dry poplin fabric of regenerated cellulose is impregnated for 5 minutes at about 50° C. in the standing bath at a goods-to-liquor ratio of 1:15. After impregnation, the fabric is squeezed off in a wringing machine, the increase in weight after squeezing off amounting to 120 percent of the weight of the goods. Then the fabric is air-dried at ordinary temperature. By this treatment a reduction of the absorptivity to about one tenth and a good water droplet repellent impregnation are obtained. The latter is increased if the fabric is additionally heated for about 30 minutes in a drying cabinet by means of hot air of about 120° C.

By the same procedure, but using no paraffin wax, the absorptivity of the goods is reduced to about one third.

*Example 2*

Dry-cleaned outer garments made of cotton poplin, of woolen gabardine or of polyamide fibres are impregnated at 20° C. for 15 minutes in a washing machine suitable for dry cleaning at a goods-to-liquor ratio of about 1:20 with a solution of aluminium-acetate-stearate, paraffin wax and paraffin slack wax in carbon tetrachloride or solvent benzine, which has been prepared as follows:

1 mol of a solution of commercial aluminium ethylate in ethyl acetate, which has been prepared according to German Patent No. 386,688 is reacted, according to German Patent No. 569,946, with 2.3 mols of glacial acetic acid and 0.7 mol of stearic acid to form aluminium-acetate-stearate. Subsequently the solvent is distilled off, the residue is melted with 1500 parts of paraffin wax and 500 parts of paraffin slack wax, and the fused mass is diluted by 3 parts by volume of perchlorethylene. On cooling, the fused mass solidifies to a product of lard-like consistency. For the preparation of the impregnation bath 1000 parts of the lard-like substance is dissolved in 20 parts by volume of carbon tetrachloride or solvent benzine. After impregnation, the goods are centrifuged in the same machine until an increase in weight of about 50 percent has been reached, then they are dried with hot air of about 70° C. and ironed, if necessary. A very good water repelling effect is obtained by this treatment.

When proceeding in the same manner but using instead of stearic acid, the same quantity of fatty acid from sperm oil or instead of glacial acetic acid the corresponding quantity of formic or propionic acid, the same results are obtained.

*Example 3*

A muslin fabric of regenerated cellulose is impregnated on the foulard (padding machine) at about 20° C. with a solution of 20 parts of aluminium-benzoate-stearate of the formula $Al(C_7H_5O_2)_{1.5}(C_{18}H_{35}O_2)_{1.5}$ and 10 parts of paraffin wax per part by volume of carbon tetrachloride. After having passed the impregnation bath, the goods are squeezed off until an increase in weight of about 80 percent has been reached, then dried at about 120° C. by means of hot air having a relative content of moisture of about 30 percent. The muslin fabric now shows very good water repelling properties.

By the same procedure but still adding 30 parts of chlorparaffin wax (contents of chlorine=40 percent) to the impregnation bath, the fabric shows the further advantage of being hardly inflammable.

When proceeding in the same way but adding instead of aluminium-benzoate-stearate the same amount of an aluminium (didodecylphosphate)-acetate of the formula $Al(C_{24}H_{50}PO_4)_{0.2}(CH_3CO_2)_{2.8}$ or aluminium monophthalimide-diacetate of the formula $$Al(C_6H_4O_2N)(CH_3CO_2)_2$$

the same results are obtained.

*Example 4*

A muslin fabric of regenerated cellulose is impregnated as described in Example 3 with a solution of 10 parts of aluminium-diacetate-mono-laurate of the formula $$Al(C_2H_3O_2)_2(C_{12}H_{23}O_2)_1$$

and 10 parts of Indonesian paraffin wax (solidification point 57/60° C.) and finished as described in that example. By this treatment very good water-repellent properties are imparted to the fabric.

The same result is obtained by using, instead of lauric acid, the equivalent quantity of commercial coconut oil fatty acid. Furthermore, instead of the above mentioned aluminium-acetate-laurate there may be used with the same success an aluminium-mono-acetate-di-naphthoate of the formula $Al(C_2H_3O_2)_1(C_{11}H_7O_2)_2$ prepared according to German patent specification 569,946 from 1 mol of aluminium isopropylate, 2 mols of alpha-naphthoic acid and 1 mol of glacial acetic acid or an aluminium-monoacetate-di(12-hydroxystearate) of the formula

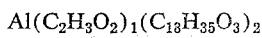

$$Al(C_2H_3O_2)_1(C_{18}H_{35}O_3)_2$$

We claim:

1. The process of imparting hydrophobic properties to fibrous material which comprises treating the material with a solution in an inert organic solvent of tribasic mixed aluminium salts with from about 1.5 to about 2.8 mols of organic acids having a boiling below about 200° under normal pressure or sublimating below the said temperature and with from about 0.2 to about 1.5 mols of organic compounds of acid nature having a boiling point of above 250° C. and being capable of forming salts with aluminium, free from OH groups, and removing the solvent from the material.

2. The process of imparting hydrophobic properties to fibrous material which comprises treating the material with a solution in an inert organic solvent of tribasic mixed aluminium salts with from about 1.5 to about 2.8 mols of low molecular aliphatic carboxylic acid having from 1 to 7 carbon atoms and with from about 0.2 to about 1.5 mols of organic compounds of acid nature having a boiling point of above 250° C. and being capable of forming salts with aluminum free from OH groups, and removing the solvent from the material.

3. The process of imparting hydrophobic properties to fibrous material which comprises treating the material with a solution in an inert organic solvent of tribasic mixed aluminium salts with from about 1.5 to about 2.8 mols of low molecular aliphatic carboxylic acid having from 1 to 7 carbon atoms and with from about 0.2 to about 1.5 mols of high molecular aliphatic carboxylic acid having a boiling point of above 250° C. and being capable of forming salts with aluminum free from OH groups, and removing the solvent from the material.

4. The process of imparting hydrophobic properties to fibrous material which comprises treating the material with a solution in an inert organic solvent of tribasic mixed aluminium salts with from about 1.5 to about 2.8 mols of acetic acid and with from about 0.2 to about 1.5 mols of high molecular aliphatic carboxylic acid having a boiling point of above 250° C. and being capable of forming salts with aluminium free from OH groups, and removing the solvent from the material.

5. The process of imparting hydrophobic properties to fibrous material which comprises treating the material with a solution in an inert organic solvent of tribasic mixed aluminium salts with from about 1.5 to about 2.8 mols of acetic acid and with from about 0.2 to about 1.5 mols of stearic acid being capable of forming salts with aluminium free from OH groups, and removing the solvent from the material.

6. The process of imparting hydrophobic properties to fibrous material which comprises treating the material with a solution in a volatile solvent selected from the group consisting of aliphatic hydrocarbons and chlorinated hydrocarbons of tribasic mixed aluminium salts with from about 1.5 to about 2.8 mols of organic acids selected from the group consisting of organic acids boiling below about 200° C. under normal pressure and organic acids sublimating below the said temperature and with from about 0.2 to about 1.5 mols of organic compounds of acid nature having a boiling point above 250° C. and capable of forming salts with aluminium free from OH groups, and further containing a hydrophobic organic substance of high molecular weight selected from the group consisting of paraffin hydrocarbons, natural waxes, synthetic waxes and polychlorinated hydrocarbons, and removing the solvent from the material.

7. The process of imparting hydrophobic properties to fibrous material which comprises treating the material with a solution in a volatile solvent selected from the group consisting of aliphatic hydrocarbons and chlorinated hydrocarbons of tribasic mixed aluminium salts with from about 1.5 to about 2.8 mols of low molecular aliphatic carboxylic acid having from 1 to 7 carbon atoms and with from about 0.2 to about 1.5 mols of organic compounds of acid nature having a boiling point of above 250° C. and capable of forming salts with aluminium free from OH groups and further containing a hydrophobic organic substance of high molecular weight selected from the group consisting of paraffin hydrocarbons, natural waxes, synthetic waxes and polychlorinated hydrocarbons, and removing the solvent from the material.

8. The process of imparting hydrophobic properties to fibrous material which comprises treating the material with a solution in a volatile solvent selected from the group consisting of aliphatic hydrocarbons and chlorinated hydrocarbons of tribasic mixed aluminium salts with from about 1.5 to about 2.8 mols of low molecular aliphatic carboxylic acid having from 1 to 7 carbon atoms and with from about 0.2 to about 1.5 mols of high molecular aliphatic carboxylic acid having a boiling point of above 250° C. and being capable of forming salts with aluminium free from OH groups, and further containing a hydrophobic organic substance of high molecular weight selected from the group consisting of paraffin hydrocarbons, natural waxes, synthetic waxes and polychlorinated hydrocarbons, and removing the solvent from the material.

9. The process of imparting hydrophobic properties to fibrous material which comprises treating the material with a solution in a volatile solvent selected from the group consisting of aliphatic hydrocarbons and chlorinated hydrocarbons of tribasic mixed aluminium salts with from about 1.5 to about 2.8 mols of acetic acid and with from about 0.2 to about 1.5 mols of high molecular aliphatic carboxylic acid having a boiling point of above 250° C. and being capable of forming salts with aluminium free from OH groups, and further containing a hydrophobic organic substance of high molecular weight selected from the group consisting of paraffin hydrocarbons, natural waxes, synthetic waxes and polychlorinated hydrocarbons, and removing the solvent from the material.

10. The process of imparting hydrophobic properties to fibrous material which comprises treating the material with a solution in a volatile solvent selected from the group consisting of aliphatic hydrocarbons and chlorinated hydrocarbons of tribasic mixed aluminium salts with from about 1.5 to about 2.8 mols of acetic acid and with from about 0.2 to about 1.5 mols of stearic acid being capable of forming salts with aluminum free from OH groups, and further containing a hydrophobic organic substance of high molecular weight selected from the group consisting of paraffin hydrocarbons, natural waxes, synthetic waxes and polychlorinated hydrocarbons, and removing the solvent from the material.

11. The process of imparting hydrophobic properties to fibrous material which comprises treating the material with a solution in a volatile solvent selected from the group consisting of aliphatic hydrocarbons and chlorinated hydrocarbons of tribasic mixed aluminium salts with from about 1.5 to about 2.8 mols of organic acids selected from the group consisting of organic acids boiling below about 200° C. under normal pressure and organic acids sublimating below the said temperature and with from about 0.2 to about 1.5 mols of organic compounds of acid nature having a boiling point above 250° C. and capable of forming salts with aluminium free from OH groups, and further containing a hydrophobic organic substance of high molecular weight selected from the group consisting of paraffin hydrocarbons, natural waxes, synthetic waxes and polychlorinated hydrocarbons and afterwards heating the impregnated material at an elevated temperature of from about 50° C. to about 200° C.

12. The process of imparting hydrophobic properties to fibrous material which comprises treating the material with a solution in a volatile solvent selected from the group consisting of aliphatic hydrocarbons and chlorinated hydrocarbons of tribasic mixed aluminium salts with from about 1.5 to about 2.8 mols of low molecular aliphatic carboxylic acid having from 1 to 7 carbon atoms and with from about 0.2 to about 1.5 mols of organic compounds of acid nature having a boiling point of above 250° C. and capable of forming salts with aluminium free from OH groups, and further containing a hydrophobic organic substance of high molecular weight selected from the group consisting of paraffin hydrocarbons, natural waxes, synthetic waxes and polychlorinated hydrocarbons and afterwards heating the impregnated material at an elevated temperature of from about 50° C. to about 200° C.

13. The process of imparting hydrophobic properties to fibrous material which comprises treating the material with a solution in a volatile solvent selected from the group consisting of aliphatic hydrocarbons and chlorinated hydrocarbons of tribasic mixed aluminium salts with from about 1.5 to about 2.8 mols of low molecular aliphatic carboxylic acid having from 1 to 7 carbon atoms and with from about 0.2 to about 1.5 mols of high molecular aliphatic carboxylic acid having a boiling point of above 250° C. and being capable of forming salts with aluminium free from OH groups, and further containing a hydrophobic organic substance of high molecular weight selected from the group consisting of paraffin hydrocarbons, natural waxes, synthetic waxes and polychlorinated hydrocarbons and afterwards heating the impregnated material at an elevated temperature of from about 50° C. to about 200° C.

14. The process of imparting hydrophobic properties to fibrous material which comprises treating the material with a solution in a volatile solvent selected from the group consisting of aliphatic hydrocarbons and chlorinated hydrocarbons of tribasic mixed aluminium salts with from about 1.5 to about 2.8 mols of acetic acid and with from about 0.2 to about 1.5 mols of high molecular aliphatic carboxylic acid having a boiling point of above 250° C. and being capable of forming salts with aluminium free from OH groups, and further containing a hydrophobic organic substance of high molecular weight selected from the group consisting of paraffin hydrocarbons, natural waxes, synthetic waxes and polychlorinated hydrocarbons and afterwards heating the impregnated material at an elevated temperature of from about 50° C. to about 200° C.

15. The process of imparting hydrophobic properties to fibrous material which comprises treating the material with a solution in a volatile solvent selected from the group consisting of aliphatic hydrocarbons and chlorinated hydrocarbons of tribasic mixed aluminium salts with from about 1.5 to about 2.8 mols of acetic acid and with from about 0.2 to about 1.5 mols of stearic acid being capable of forming salts with aluminium free from OH groups, and further containing a hydrophobic organic substance of high molecular weight selected from the group consisting of paraffin hydrocarbons, natural waxes, synthetic waxes and polychlorinated hydrocarbons and afterwards heating the impregnated material at an elevated temperature of from about 50° C. to about 200° C.

16. The process of imparting hydrophobic properties to fibrous material which comprises treating the material with a solution in a volatile solvent selected from the group consisting of aliphatic hydrocarbons and chlorinated hydrocarbons of tribasic mixed aluminium salts with from about 1.5 to about 2.8 mols of organic acids selected from the group consisting of organic acids boiling below about 200° C. under normal pressure and organic acids sublimating below the said temperature and with from about 0.2 to about 1.5 mols of organic compounds of acid nature having a boiling point above 250° C. and capable of forming salts with aluminium free from OH groups, and further containing a hydrophobic organic substance of high molecular weight selected from the group consisting of paraffin hydrocarbons, natural waxes, synthetic waxes and polychlorinated hydrocarbons and afterwards heating the impregnated material at an elevated temperature of from about 50° C. to about 200° C. in the presence of moisture.

17. The process of imparting hydrophobic properties to fibrous material which comprises treating the material with a solution in a volatile solvent selected from the group consisting of aliphatic hydrocarbons and chlorinated hydrocarbons of tribasic mixed aluminium salts with from about 1.5 to about 2.8 mols of low molecular aliphatic carboxylic acid having from 1 to 7 carbon atoms and with from about 0.2 to about 1.5 mols of organic compounds of acid nature having a boiling point of above 250° C. and capable of forming salts with aluminium free from OH groups, and further containing a hydrophobic organic substance of high molecular weight selected from the group consisting of paraffin hydrocarbons, natural waxes, synthetic waxes and polychlorinated hydrocarbons and afterwards heating the impregnated material at an elevated temperature of from about 50° to about 200° C. in the presence of moisture.

18. The process of imparting hydrophobic properties to fibrous material which comprises treating the material with a solution in a volatile solvent selected from the group consisting of aliphatic hydrocarbons and chlorinated hydrocarbons of tribasic mixed aluminium salts with from about 1.5 to about 2.8 mols of low molecular aliphatic carboxylic acid having from 1 to 7 carbon atoms, and with from about 0.2 to about 1.5 mols of high molecular aliphatic carboxylic acid having a boiling point of above 250° C. and being capable of forming salts with aluminum free from OH groups, and further containing a hydrophobic organic substance of high molecular weight selected from the group consisting of paraffin hydrocarbons, natural waxes, synthetic waxes and polychlorinated hydrocarbons and afterwards heating the impregnated material at an elevated temperature of from about 50° C. to about 200° C. in the presence of moisture.

19. The process of imparting hydrophobic properties to fibrous material which comprises treating the material with a solution in a volatile solvent selected from the group consisting of aliphatic hydrocarbons and chlorinated hydrocarbons of tribasic mixed aluminium salts with from about 1.5 to about 2.8 mols of acetic acid and with from about 0.2 to about 1.5 mols of high molecular aliphatic carboxylic acid having a boiling point of above 250° C. and being capable of forming salts with aluminium free from OH groups, and further containing a hydrophobic organic substance of high molecular weight selected from the group consisting of paraffin hydrocarbons, natural waxes, synthetic waxes and polychlorinated hydrocarbons and afterwards heating the impregnated material at an elevated temperature of from about 50° C. to about 200° C. in the presence of moisture.

20. The process of imparting hydrophobic properties to fibrous material which comprises treating the material with a solution in a volatile solvent selected from the group consisting of aliphatic hydrocarbons and chlorinated hydrocarbons of tribasic mixed aluminium salts with from about 1.5 to about 2.8 mols of acetic acid and with from about 0.2 to about 1.5 mols of stearic acid being capable of forming salts with aluminium free from OH groups, and further containing a hydrophobic organic substance of high molecular weight selected from the group consisting of paraffin hydrocarbons, natural waxes, synthetic waxes and polychlorinated hydrocarbons and afterwards heating the impregnated material at an elevated temperature of from about 50° to about 200° C. in the presence of moisture.

References Cited in the file of this patent

UNITED STATES PATENTS 2,599,553    Hotten _____ June 10, 1952

FOREIGN PATENTS 401,712    Great Britain _____ Nov. 13, 1933